United States Patent
Berenyi et al.

(10) Patent No.: US 7,231,484 B2
(45) Date of Patent: Jun. 12, 2007

(54) METHOD AND MEMORY CONTROLLER FOR SCALABLE MULTI-CHANNEL MEMORY ACCESS

(75) Inventors: Attila Berenyi, Gothenburg (SE); Fredrik Dahlgren, Lund (SE); Anders Wesslen, Staffanstorp (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 10/529,621

(22) PCT Filed: Sep. 19, 2003

(86) PCT No.: PCT/EP03/10509

§ 371 (c)(1),
(2), (4) Date: Oct. 17, 2005

(87) PCT Pub. No.: WO2004/029816

PCT Pub. Date: Apr. 8, 2004

(65) Prior Publication Data
US 2006/0129767 A1    Jun. 15, 2006

Related U.S. Application Data

(60) Provisional application No. 60/415,980, filed on Oct. 3, 2002.

(30) Foreign Application Priority Data
Sep. 30, 2002   (EP) .................................. 02388067

(51) Int. Cl.
*G06F 13/36* (2006.01)

(52) U.S. Cl. ...................................... 710/308; 711/147
(58) Field of Classification Search ................... 710/7, 710/21, 308, 316; 711/148, 149, 150, 157, 711/168, 169
See application file for complete search history.

(56) References Cited

U.S. PATENT DOCUMENTS

| 5,202,973 | A  | * | 4/1993  | Ramanujan et al. ......... 711/147 |
| 5,761,455 | A  |   | 6/1998  | King et al. |
| 5,878,240 | A  | * | 3/1999  | Tomko ....................... 710/316 |
| 6,038,630 | A  |   | 3/2000  | Foster et al. |
| 6,076,139 | A  |   | 6/2000  | Welker et al. |
| 6,327,642 | B1 |   | 12/2001 | Lee et al. |
| 6,378,049 | B1 | * | 4/2002  | Stracovsky et al. ......... 711/147 |

FOREIGN PATENT DOCUMENTS

JP        59142655        8/2004

OTHER PUBLICATIONS

International Preliminary Examination Report for PCT/EP03/10509.

* cited by examiner

*Primary Examiner*—Khanh Dang
(74) *Attorney, Agent, or Firm*—Michael Cameron, Esq.

(57) ABSTRACT

An electrical device is connected to at least one memory accessing unit and to a memory including at least one physical memory module. The device includes at least one access channel circuit connected to the least one memory accessing unit via at least one system bus and to the at least one physical memory module. The access channel circuit provides memory access for the at least one memory accessing unit to at least a part of the memory.

10 Claims, 4 Drawing Sheets

METHOD AND MEMORY CONTROLLER FOR SCALABLE MULTI-CHANNEL MEMORY ACCESS

RELATED APPLICATIONS

The present application is a 35 U.S.C. §371 national phase application of PCT International Application No. PCT/EP03/010509, having an international filing date of Sep. 19, 2003, and claiming priority to European Patent Application No. 02388067.7, filed Sep. 30, 2002, and United States Provisional Patent Application No. 60/415,980, filed Oct. 3, 2002, the disclosures of which are incorporated herein by reference in their entireties. The above PCT International Application was published in the English language and has International Publication No. WO 2004/029816 A2.

FIELD OF THE INVENTION

The present invention relates to an electrical device for efficient and flexible control of memory access.

The present invention also relates to a method of efficient and flexible control of memory access.

Additionally, the invention relates to a computer readable-medium comprising a program, which may cause a computer to perform the method of the present invention.

BACKGROUND

In ASIC (Application Specific Integrated Circuit) solutions and other types of integrated circuits especially for baseband and application processing in e.g. mobile phones, there are typically several units accessing memory, for example one or more CPUs, one or more DSPs, one or more communication links (wireless, UART, USB, etc.), and/or potentially also hardware accelerators for certain applications, routines, procedures, etc. Furthermore, the system normally has several instances and/or types of memory, which may comprise off-chip volatile, off-chip non-volatile, and different types of on-chip memory. These memories tend to be shared, completely or in part, by the various units that access memory. There is thus need for a memory controller that route memory accesses from and to the memory units and the units that access memory as efficiently as possible.

In most embedded systems, the memory controller is such that only one unit at a time is allowed to access any of the memories that are shared, i.e. a complete serialization of accesses to these memories. This is a low-complexity solution, where the accessing units might be sharing a single memory bus, and where the memories are all connected to this shared bus. The performance of such processing systems, on the other hand, is poor, and the impact when having real-time critical software can be devastating; either the real-time critical tasks get constant high priority access to the memories, which might result in 'starvation' of other tasks, and/or the system might show poor real-time characteristics.

In other solutions, a network of data links or buses is supported so that the unit's memory requests can be independently routed to their target memory, and memory conflicts appear only when more than one unit access the same physical memory module or memory bank that can be separately accessed. While such solutions provide much better performance, they have traditionally been considered significantly more complex; not only in terms of actual silicon area (which is becoming less significant), but also in terms of power consumption and engineering effort. The latter because most such solutions are uniquely designed for a specific system or implementation and are not designed to be scalable. Scalable in this context means that the same basic design and architecture can be used for both low-end, rather low-functionality, and small-area implementations as well as high-end, functionality-rich and performance demanding implementations.

Support for data transfer, such as DMA (Direct Memory Access), varies in complexity and functionality. Many present embedded systems has a simple DMA unit, that after setup by the CPU transfers a programmable amount of data from a programmable memory region to another programmable memory region. The transfer can be carried out without any intervention by a processor (except a programming/setup phase). If the data transfer occupies memories separate from the other accessing units and if the memory controller/network supports such parallel access, the data transfer will not cause any overhead. If accessing units target the same memory or memory bank as the DMA data transfer, there are typically two different schemes. Transparent DMA allows the DMA accesses to be carried out only when the memories are temporarily idle, on a granularity of individual accesses, while in non-transparent DMA much larger chunks of data are transferred which might lead to other units being locked out from the involved memories during a protracted consecutive period of time.

Some DMA controllers are more sophisticated, and support some number of virtual channels mapped on another number of physical channels in such a way that each physical channel defined by some interconnect capabilities can be programmed to take care of a number of different ongoing data channels. Each of these data channels can be either setup to transfer a given region of data from one memory to another, or be setup to move incoming data from a UART or USB interface buffer to other buffers dependent on signalling from the UART or USB where the buffer addresses are changed dynamically according to a pre-defined pattern (for example, double- or triple-buffering, each being filled in turn), etc. Such DMA controllers are often separate from the memory controller, although they have one or several data channels into it. Moreover, such DMA controllers are often rather complex circuits being designed to be inserted as a part of a design and are not scalable.

Many previous implementations of memory controllers as well as mechanisms that support data transfers exist. However, there are certain features not commonly found that are critical to upcoming architecture generations having a need for efficient, relatively low-complexity and/or scalable solutions.

First, since the solution must be scalable it must support a range of designs, and thereby it cannot be overly complex. At the same time, one requirement for performance as well as real-time issues is that different units shall be able to access different memories or memory banks independently without conflict. In addition, appropriate support for automatic data transfers is imperative, and because of the different characteristics of various software, it should be possible to be setup and act dynamically. The combined requirements of parallelism of independent accesses, dynamic support for automatic data transfers, scalability, and rather low complexity typically make the commonly known solutions inappropriate. While low-end implementations have few units accessing memory and rather low performance demands, their complexity must be kept rather low and the silicon area small. By contrast, a high-end implementation has demands on high-performance and more units accessing more memories or memory banks. Traditionally, this leads to completely different designs increasing the complexity of ASIC design, software design, test and verification.

U.S. Pat. No. 6,327,642 discloses a memory system comprising a main memory coupled to a plurality of parallel virtual access channels designed to improve memory access.

However, the use of cache in connection with access channels adds to the complexity of the design. Additionally, no support for DMA/data transfer between parts of the memory is given. Additionally, no support of pre-fetching, chaining or dynamic control giving flexibility is disclosed.

The object of the invention is to provide an electrical device for controlling memory access that is efficient, highly flexible and enables scalable implementation.

An additional object is to provide an electrical device for controlling memory access that enables a reduction of the risk of conflict with respect to memory access between memory accessing devices.

SUMMARY OF EMBODIMENTS OF THE INVENTION

These objects (among others) are achieved by an electrical device for efficient and flexible control of memory access, said device being
   connected to at least one memory accessing unit, and
   connected to a memory comprising at least one physical memory module, said device comprising at least two access channel circuits, where at least one access channel circuit is connected to said least one memory accessing unit via at least one system bus and to said at least one physical memory module, said at least one access channel circuit providing memory access for said at least one memory accessing unit to at least a part of said memory.

Hereby, all memory accessing units are able to access the memories needed by them as long as they do not access the same part of the memory. Additionally, unnecessary conflicts can be avoided, i.e. if two units access different parts of the memory, different memories, different memory modules or different memory banks they are able to do so without delaying each other as long as the two units are independent.

The memory may be shared completely or in part by the memory accessing units i.e. several memory accessing units may have access to the same part of the memory.

In a preferred embodiment, said at least two access channel circuits each provides memory access for at least one memory accessing unit to at least a part of the memory thereby allowing memory accessing units connected to different access channel circuits independent and simultaneous/parallel access to different parts of the memory.

Hereby, the parallel memory access of different memory accessing units is achieved with a relatively low complexity of the resulting memory device. The dynamic control of the control and configure circuit also enables flexibility, since the access channel circuit responsible for an individual data transfer may be controlled and setup dynamically and may act independently.

Additionally, the memory controller is easy to implement and configure for systems requiring single or multiple access channels.

In this way, a device for controlling memory access/a memory controller that is scalable is achieved since (during implementation) scalability is reached by letting the design of the access channel be such that more connectivity and more accessing parallelism is achieved simply by adding more access channels rather than increasing the complexity on each of them during implementation. The required additional wirings, connections, etc. needed to implement an additional access channel circuit are simply one connection between the additional access channel circuit and the control and configure circuit.

In this way, the number of parallel and independent access channels towards memory can be tuned to best match a given system requirement, need, etc.

In one embodiment, the device comprises a control and configure circuit dynamically controlling said at least two access channel circuits, said control and configure circuit allowing for simple addition of further access channel circuits during implementation.

In accordance with one embodiment, said device comprises at least two access channel circuits each being connected via a single system bus to a single memory accessing unit and each being connected to receive information/data from at least a part of said memory.

Hereby, increased parallel and independent data/information transferral speed is obtained, since data/information may be retrieved and transmitted via both system buses. This requires the memory accessing unit to be able to handle incoming-data/information on two connected system buses. The increased speed also causes the time during which the access channel circuits are occupied to be reduced thereby reducing the risk of the conflicting memory accesses. Two different access channel circuits may simultaneously access different parts (i.e. different physical memory modules) of the same memory. If they access the same part of the memory, the memory will serialise the accesses according to some scheme and one access channel circuit will have to wait for the other. The system bus between the memory accessing unit and the access channel circuits is a separate and different system bus.

In one embodiment, said device comprises one access channel circuit connected via a single system bus to at least two memory accessing units, said one access channel circuit being connected to receive data/information from and/or transmit data/information to at least a part of said memory.

This reduces the overall complexity of the memory controller even further but may increase the risk of conflict. However, the risk is minimised or avoided completely if the two or more memory accessing devices never or very seldom need access to the same physical memory module at the same time, i.e. the two or more memory accessing devices are good candidates to be connected to the same system bus without compromising the efficiency of the memory controller according to the present invention.

In one embodiment, an access channel circuit further comprises an automatic data transfer engine for transferring data/information from a first part/a first physical memory module of the memory to a second part/a second physical memory module of the memory prior to the a memory accessing device retrieving said data/information. The automatic data transfer may be activated by a specific command, address range, etc. from the control and configure circuit, by pattern matching, etc. on the incoming (to the specific access channel) system bus(es).

In this way, support for Direct Memory Access (DMA), a control unit that is capable of reading data from one memory and store it in another without the intervention of a CPU (other than for the setup), is obtained in a simple way. Hereby it is possible to transfer e.g. a large amount of data, code, information, etc. between memories (e.g. from slow memory to fast(er) memory) prior to the usage of the data by the accessing units (e.g. CPUs), thereby hiding access latency of slower memories and speeding up the information retrieval process.

In one embodiment, the automatic data transfer engines of a plurality of access channel circuits are connected to form a chain of automatic data transfer engines where each data transfer engine is responsible for transferring a different part of said data/information.

In this way, optimisation of memory access sequences and a reduction of the average occupancy of individual links or control units are possible.

In one embodiment, said at least one access channel circuits comprises at least one special purpose register and is connected to said control and configure circuit, where said control and configure circuit is adapted to modify a content of said at least one special purpose register thereby allowing for reconfiguration of individual access channel circuits without affecting other access channels during operation.

This allows for easy dynamic configuration of a mode of operation of a given access channel circuit.

In one embodiment, said reconfiguration comprises configuration of a mode of functionality and/or at least one access region of said memory.

In one embodiment, said device comprises one access channel circuit for each connected memory accessing unit and in that each access channel circuit is connected with each memory module of said memory.

In this way, the only possible conflict will occur only when a plurality of accessing units simultaneously access the same memory module. This greatly reduces the risk of conflicting memory access by various memory accessing units, which may greatly improve the performance of the memory controller. This is especially important for real-time or substantially real-time applications, operations, etc.

In one embodiment, an access channel circuit comprises
   a memory access controller adapted to monitor an incoming system bus connected to a memory accessing device, and an outgoing system bus connected to a memory accessing device for a first identifier representing a given memory bus to be connected (e.g. representing the address of the memory bus), the memory access controller providing a first control signal/code, based on said first. identifier, representing said given memory bus and to where said given memory bus is to be connected,
   a source and destination selector for enabling access to a memory bus, connected to a memory module of said memory, from said incoming system bus or said memory access controller dependent on said first control signal/code received from said memory access controller, and
   a memory module selector for selecting which memory module is to be connected to the outgoing system bus, connected to said memory accessing device, during a given read access of a specific memory module dependent on a second unique identifier.

The invention also relates to a method (and embodiments thereof) of controlling memory access that has the same objects and advantages as the device (and embodiments thereof according to the present invention.

This is achieved by a method of efficient and flexible control of memory access between at least one memory accessing unit and a memory comprising at least one physical memory module, the method comprising the step of:
   providing, by at least one of at least two access channel circuits, memory access for said at least one memory accessing unit to at least a part of said memory, where said at least one access channel circuit is connected to said least one memory accessing unit via at least one system bus and to said at least one physical memory module.

In one embodiment, the method comprises the step of providing simultaneous memory access for said at least two memory accessing units to at least a part of the memory via said at least two access channel circuits, each access channel providing independent access to different parts of the memory, thereby allowing memory accessing units connected to different access channel circuits parallel access to different parts of the memory.

In one embodiment, the method further comprises the step of:
   dynamically controlling said at least two access channel circuits by a control and configure circuit, said control and configure circuit allowing for simple addition of further access channel circuits during implementation.

In one embodiment, the method further comprises the step of:
   providing memory access to a single memory accessing unit from at least a part of said memory by at least two access channel circuits each being connected via a single system bus to the single memory accessing unit and each being connected to receive information/data from at least a part of said memory.

In one embodiment, the method comprises the step of:
   providing memory access to at least two memory accessing units from at least a part of said memory by a single access channel circuit connected via a single system bus to said at least two memory accessing units, said single access channel circuit being connected to receive data/information from and/or transmit data/information to at least a part of said memory.

In one embodiment, the method further comprises the step of:
   providing automatic data transfer of data/information by an access channel circuit comprising an automatic data transfer engine for transferring data/information from a first physical memory module of the memory to a second physical memory module of the memory prior to a memory accessing device retrieving said data/information.

In one embodiment, the method comprises the step of:
   providing automatic data transfer of data/information where a plurality of automatic data transfer engines of a plurality of access channel circuits are connected to form a chain of automatic data transfer engines and where each data transfer engine is responsible for transferring a different part of said data/information.

In one embodiment, the method comprises the step of:
   modifying, by said control and configure circuit, a content of at least one special purpose register, comprised by at least one access channel circuit connected to said control and configure circuit, thereby allowing for reconfiguration of individual access channel circuits without affecting other access channels during operation.

In one embodiment, the reconfiguration comprises configuration of a mode of functionality and/or at least one access region of said memory.

In one embodiment, the memory access is provided by one access channel circuit for each connected memory accessing unit where each access channel circuit is connected with each memory module of said memory.

In one embodiment, the method further comprises the steps of:

monitoring, by a memory access controller comprised by an access channel circuit, an incoming system bus, connected to a memory accessing device, and an outgoing system bus connected to a memory accessing device for a first identifier representing a given memory bus to be connected, providing, by the memory access controller, a first control signal/code, based on said first identifier, representing said given memory bus and to where said given memory bus is to be connected, enabling access, by a source and destination selector, to a memory bus, connected to a memory module of said memory, from said incoming system bus or said memory access controller dependent on said first control signal/code received from said memory access controller, and selecting, by a memory module selector, which memory module is to be connected to the outgoing system bus, connected to said memory accessing device, during a given read access of a specific memory module dependent on a-second unique identifier.

The invention also relates to the use of the electrical device and/or the method according to present invention used in a mobile communications terminal.

Further, the invention relates to a computer-readable medium having stored thereon instructions for causing a processing unit or a computer system to execute the method described above and in the following. A computer-readable medium may e.g. be a CD-ROM, a CD-R, a DVD RAM/ROM, a floppy disk, a hard disk, a smart card, a network accessible via a network connection, a ROM, RAM, and/or Flash memory, etc. or generally any other kind of media that provides a computer system with information regarding how instructions/commands should be executed.

Hereby, when a computer is caused to retrieve electronic information—as a consequence of the contents of a computer-readable medium as described above—the advantages mentioned in connection with the corresponding method according to the invention are achieved.

BRIEF DESCRIPTION OF THE DRAWINGS

The present invention will now be described more fully with reference to the drawings, in which.

DESCRIPTION OF EMBODIMENTS ACCORDING TO THE INVENTION

Figure 1:
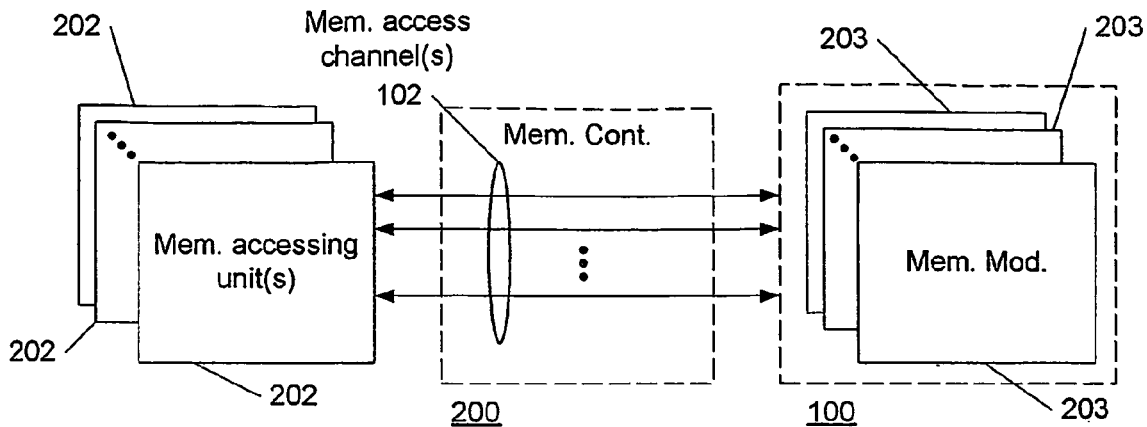
FIG. 1 shows a schematic representation of the present invention.

FIG. 1 shows a schematic representation of the present invention. Shown is a number (which may be one or more) of memory accessing units (202) such as CPUs (Central Processing Units), specialised or general processing units, DSPs (Digital Signal Processors) or other types of processors/units needing (read and/or write) access to a memory. The one or more memory accessing units (202) are also designated master devices in the following.

Also shown is a representation of a memory (100) comprising at least one physical memory module, circuit, bank, etc. (203) where data and/or information is and/or may be stored, read, retrieved, moved, etc. The memory (100) may comprise off-chip volatile memory, off-chip non-volatile memory, and/or different types of on-chip memory. The memory may be shared, completely or in part, by the various memory accessing units (202), i.e. several memory accessing units (202) may have access to the same memory module(s) and/or part(s) thereof, same memory (address) range, etc. The memory (100) preferably comprises a number of physical memory modules (203), where a memory module (203) may either contain one or several physical memories arranged in many different widely known ways.

Additionally, a memory controller/a device for controlling memory access (200) according to the present invention is illustrated. The memory controller (200) comprises a control and configure circuit (see e.g. FIG. 2) and a number (which may be one or more) of logic 'access channels' (102), where one or more of the access channels (102) is connected to a memory accessing unit (202) (same or different) and responsible for enabling read and/or write access to at least a part of the memory (100) under the control of the memory controller (200). Each access channel (102) is connected to at least one physical memory module (203), which may be organised into a single or multiple memory banks or not. An access channel (102) is implemented by a memory access circuit, e.g. as the one (300) shown in connection with FIG. 3 where one embodiment of such a circuit is shown. Additionally, the memory controller (200) may comprise at least one access channel (102) providing automatic data transfer between physical memory modules (203) as explained in the following. Access channels (102) used for automatic data transfer do not have to be connected to a memory accessing unit (202) (although they may be). Additionally, such access channels (102) may be linked together, also as described in the following.

The present invention enables memory accessing units (202) connected to different access channels (102) and accessing different physical memory modules (203) to operate without or with less risk of conflict. In one exemplary embodiment, where each accessing unit (202) is connected to a separate access channel (102) and each access channel is connected to all memory modules (202), i.e. the complete memory (100), the only possible memory access conflict will occur only when a plurality of accessing units (202) simultaneously accesses the same memory module (203). This greatly reduces the risk of conflicting memory access by various memory accessing units (202), which may greatly improve the performance of the memory controller. This is especially important for real-time or substantially real-time applications, operations, etc.

Alternative embodiments include several memory accessing devices (202) connected to the same access channel (102) (this reduces the overall complexity of the memory controller (200) but may increase the risk of conflict. However, the risk is minimised or avoided completely if the several (i.e. two or more) memory accessing devices (202) never or very seldom need access to memory at the same time and/or need access to the same physical part of the memory (100));

several access channels (102) connected to the same memory accessing device (202);

one access channel (102) connected exclusively to a part of the memory (100) or a memory module (203) (i.e. the exclusively part of the memory is only addressable through that particular access channel);

only some of the access channels (102) being connected to each memory module (203) (this reduces the overall complexity of the memory controller (200) but may give a slight increase in the risk of conflict greatly dependent on the specific accessing devices (202) and their purpose);

one access channel (102) connected to one or more memory accessing devices (202);

and/or combinations thereof.

The principle of scalability of the design according to the present invention is reached by letting the design of the access channel (102) be such that more connectivity and more accessing parallelism is achieved simply by adding more access channels (102) rather than increasing the complexity of each of them during the design phase of the memory controller (200). This gives a very simple and uncomplicated way of achieving scalability. The number of access channels (102) is fixed once the specific controller is implemented according to a specific design and/or to meet a given task, situation, etc.

Additionally, the access channel circuits of a given memory controller need not be entirely identical dependent on the given implementation.

The control and configure circuit (see e.g. FIG. 2) of the memory controller (200) is used for controlling and configuring access channel circuit(s) (300 in FIG. 2 and explained in connection thereto) of the logical access channel(s) (102) in the memory controller (200). The impact to the control and configure circuit and the rest of the design of additional access channels in the memory controller (200) is kept at a minimum as the control and configure circuit simply needs to accommodate more access channels connected to already existing buses.

Preferably, all access channels (102) are the same but may be configured independently into different modes of functionality and access regions of memory (100) under the control of the control and configure circuit. Each access channel (102) preferably comprises an automatic data transfer engine which can be triggered on a specific command e.g. issued by the control and configure circuit, by pattern matching on the incoming (to the access channel(s)) relevant bus(es), etc. Preferably, configuration of an access channel (102) may be done without interrupting other access channels in normal operation mode, as will be explained in the following.

The automatic data transfer engine is responsible for transferring data, information, code, etc. between different physical memories (203) and/or different parts of the memory (100). Additionally, by setting up automatic data transfer session(s), i.e. using the automatic data transfer engines, it is possible to transfer e.g. a large amount of data or code between physical memories (e.g. from slow memory to fast(er) memory) prior to the usage of the data by the accessing units (e.g. CPUs), thereby hiding access latency of slower memories and speeding up the information retrieval process. Preferably, the automatic data transfer engine(s) is implemented by a memory access controller as described in connection with FIG. 3.

Each memory accessing unit (202) with a dedicated access channel (102) can access the memory (100) through their dedicated channel (102), which is independent of other access channels (102), in parallel, i.e. for example two accessing units (202) each having their own dedicated channel (102) may access the memory (100) in parallel/at the same time (as long as they are not accessing the same memory part/address/range or memory module (203) at the same time). This enables the memory controller to support as many parallel memory access sessions as there are access channels (dependent on memory partitioning, i.e. to which parts of the memory (100) the access channels (102) are connected to).

Further, it is possible in a simple way to link data transfer engines in different access channels (102) together into one or several transfer chains (dependent on the number of access channels (102)), which e.g. may be used for specific memory access sequences. By using data transfer chain(s) a large memory transaction mapped to a specific access channel can be split into multiple but smaller transactions. This will reduce the time a specific access channel is blocked and will thereby also reduce potential resource conflicts and increase memory availability/access, since the job is done more quickly.

The memory controller/device for controlling memory access (200) is explained in greater detail in connection with FIG. 2.

Figure 2:
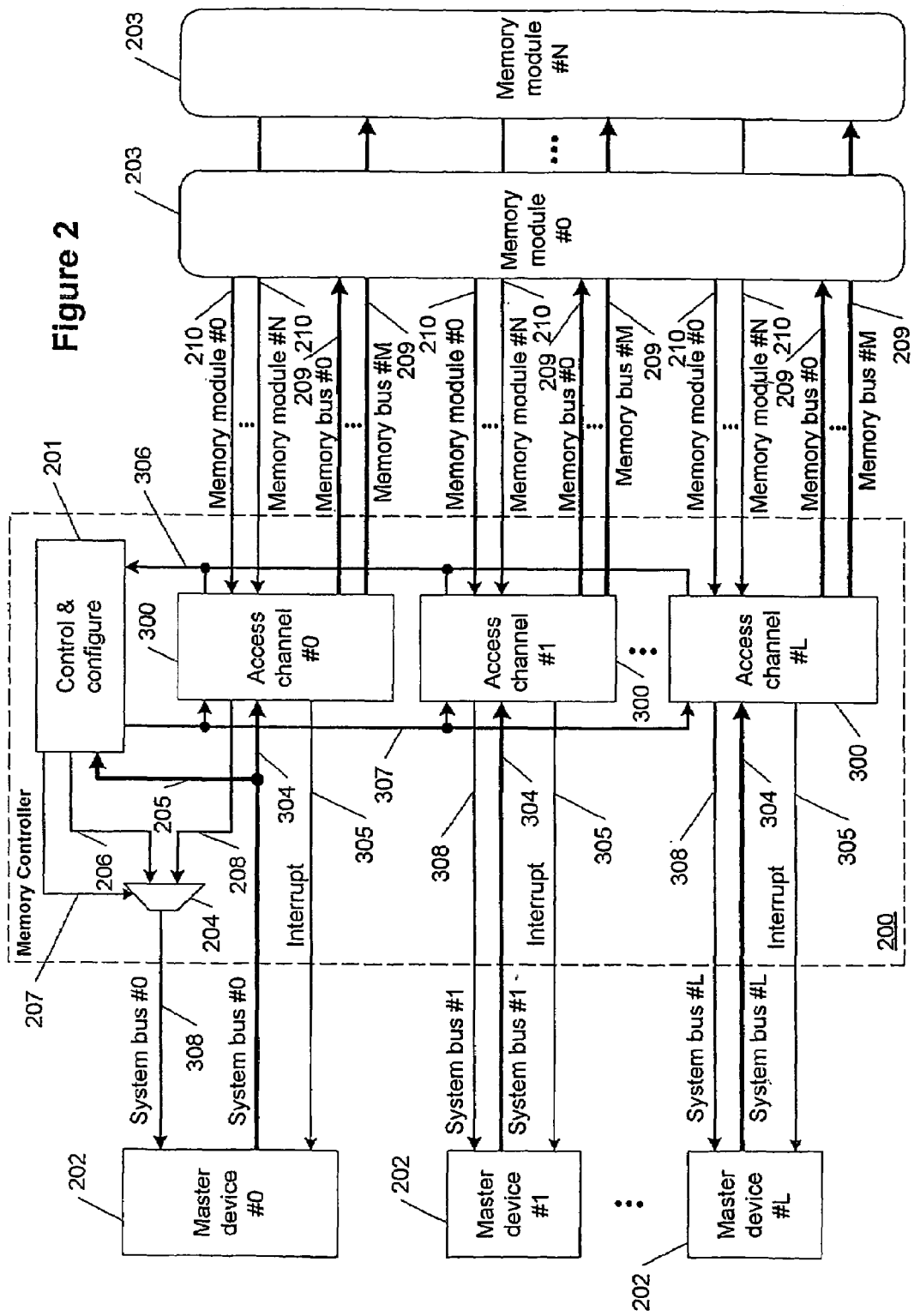
FIG. 2 illustrates a more detailed schematic representation of an embodiment according to the present invention.

FIG. 2 illustrates a more detailed schematic representation of an embodiment according to the present invention. Shown are L+1 (in the notation used where the first master device is designated A) master devices/memory accessing units (202) connected to L+1 access channel-circuits (300) comprised in a memory controller (200) according to the present invention. Each master device (202) being connected to the memory controller (200) has, in this particular embodiment, a dedicated access channel (300) through which the master device (202) may communicate directly with at least one physical memory module (203) of a centralised shared (completely, as in this embodiment, or in part) memory where the memory module(s) (203)/the memory may be located either on-chip and/or off-chip e.g. of different kind (volatile or non-volatile, different speed, size, layout, etc.). The value L may be equal to 0 or larger dependent on the specific embodiment/implementation. The master devices (202) are in this particular embodiment each connected to a single different access channel circuit (300) via a system bus (304, 308), although other layouts may be applicable for other implementations as explained in the following. Each master device (202) may also be connected to receive an interrupt signal via connection (305) from each access channel circuit (300) that the master device (202) is connected to. The interrupt signal may e.g. be used to signal the connected master device (202) that the access channel circuit (300) has finished performing a task. Alternatively, polling may be used, whereby the interrupt connection(s) (305) is redundant and may be omitted for one or more master devices (202)/access channel circuits (300). The number of master devices (202) does not have to be equal to the number of access channels (300) since multiple master devices (202) may be connected to the same system bus (304, 308) and thereby the same access channel circuit(s) (300). Additionally, each master device (202) may be connected to more than one access channel circuit (300), etc. as explained elsewhere.

Each access channel circuit (300) is connected for communicating information/data via one or more memory buses (209) to one or more physical memory modules (203) and for receiving information from one or more memory modules via connection (210). In this particular embodiment, every access channel circuit (300) is connected to N+1 memory modules (203) via N+1 connections (210) for receiving information/data and via M+1 memory buses (209) for transmitting, addressing, etc. information/data. N and M may both be equal to 0 or larger and may be equal or different.

Figure 3:
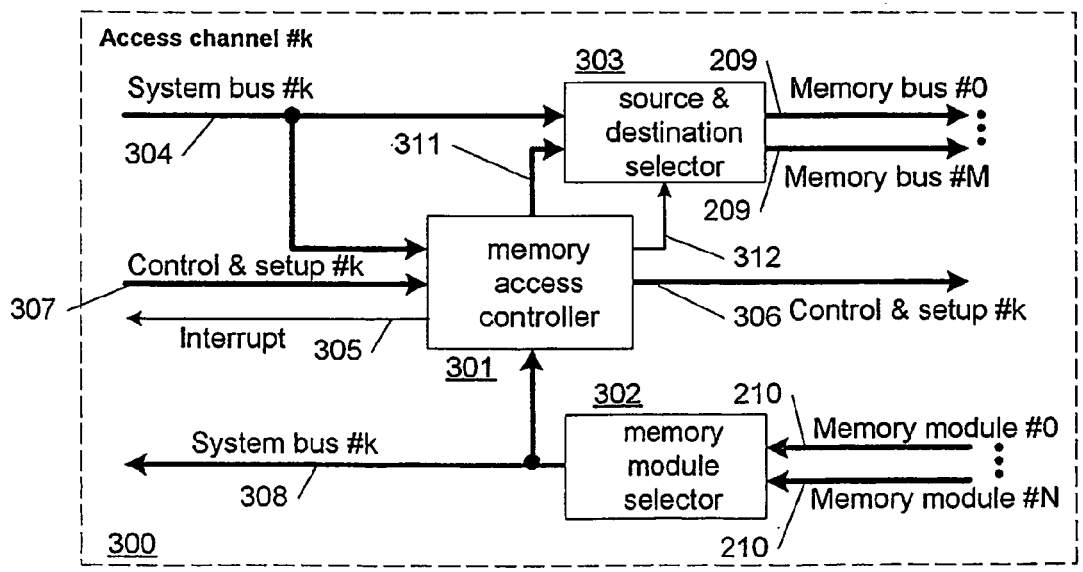
FIG. 3 illustrates a schematic representation of an embodiment of a single access channel circuit in a memory controller according to an embodiment of the present invention.

In this particular embodiment, only one physical memory module (203) is connected to each memory bus (209), i.e. M and N are equal, but several memory modules (203) may share a single memory bus (209) and memory decoding logic (not shown; see FIG. 3 (302)) will determine which memory module (203) is accessed. Alternatively, M may be larger than N and vice versa.

Additionally, the memory controller (200) may comprise access channel(s) (300) used only for automatic data transfer between physical memory modules (203), where these kinds of access channel(s) do not have to be connected to a system bus (304, 308) or have an interrupt connection (305). This could e.g. be used for moving data from a slow physical memory to a faster physical memory prior to transferral of the data/information to a master device (202).

The physical memory module (203) in this schematic representation represents both the physical memory and a memory interface.

The memory controller (200) may be configured and controlled through a dedicated 'Configuration and Control circuit' (201) that is connected to the system bus #0 (304, 308). Special purpose registers in the Configuration and Control circuit (201) and in the access channel circuit(s) (300) are preferably all address mapped on to the system bus #0 (308). During access to an access channel circuit specific register, the address received by the Configuration and Control circuit (201) on system bus #0 (304) via connection (205) is translated to an internal memory controller address which is then used for accessing the specific register in the appropriate access channel circuit (300) through the internal memory controller bus (307). The connection (205) is preferably only used for status and/or change of functionality of the access channel circuit(s) (300) purposes. The internal bus (306) may also used for sending data/information from the access channel(s) (300) to the control and configure circuit (201). This data/information may e.g. be status information and/or data retrieved from a memory module (203). A multiplexer (204) on the system bus #0 (308) is used to select if data is to be read from the Configuration and Control circuit (201) or a memory module (203) connected to access channel #0 (300). When the Configuration and Control circuit (201) is addressed via system bus #0 (304) for a read process, the multiplexer (204) selects an output signal (206) from the Control and Configure circuit (201) on the basis of a control signal (207) also from the Control and Configure circuit (201). For all other purposes, the system bus (208 (=308 in FIG. 3 for access channel #0)) is preferably connected to the outgoing system bus #0 (308) by the multiplexer (204). I.e. the multiplexer (204) determines whether master device #0 reads data/information from the Configuration and Control circuit (201) or from access channel circuit #0 (300) based on a control signal (206) from the Configuration and Control circuit (201). In the shown example only MD #0 is able to issue/initiate control and configure commands. However, it is possible to let other MD's be able to do this with minor modifications in design and implementation, e.g. by extending connection (205) to other incoming system buses (304).

An embodiment of an access channel circuit (300) is described in greater detail in connection with FIG. 3.

A read process could take place e.g. as follows:

The master device #0 (202) issues an instruction, command, specific pattern, etc. for retrieval of/reading the content of a given memory range/address on the incoming system bus #0 (304), e.g. simply by putting the memory range/address on the bus (304) together with a representation/identifier of a read process. This is received by access channel circuit #0 (300), which determines the physical memory module(s) (203) that corresponds to/comprises the requested memory range/address and the memory bus (209) associated with the memory module (203) if access channel circuit #0 is connected to the physical memory module (203) comprising the information. An instruction is then sent via the selected memory bus (209) (e.g. memory bus #2) to the appropriate memory module (203) (e.g. memory module #2), which returns the data/information stored at the requested memory range to access channel circuit #0 (300) via a memory module connection (210) (e.g. connection #2). The access channel may then provide the retrieved information/data to outgoing system bus (208) and (308) via the multiplexer (204) to the requesting master device #0 (202). If access channel circuit #0 is not connected to the memory module (203) comprising the request information/data the internal buses (306) and (307) and the control and configure circuit (201) is used to transfer the request to an access channel that is connected to the applicable memory module (203). The information/data is transmitted back to access channel circuit (300) #0 in the same way. However, each access channel circuit (300) is preferably connected to each physical memory module (203). This read process may be performed in parallel with other master devices accessing the memory as long as they do not access the same specific physical memory module at the same time.

A pre-fetch/automatic data transfer operation could take place e.g. as follows:

The master device #0 (202) issues a pre-fetch/automatic data transfer instruction on the incoming system bus #0 (304) for data/information content of a given memory range/address located in a relatively slow physical memory. The instruction is received by a first connected access channel circuit #0 (300), which then initiates the retrieval process itself if it is connected to the relevant physical memory module being accessed or signals another access channel circuit (300) (e.g. #1), via the internal buses (306) and (307) and the control and configure circuit (201), to retrieve the information. The first or the other access channel circuit (300) (e.g. #1) initiates the retrieval of information by selecting an appropriate memory bus (209) to the relatively slower memory and receives the information via a memory module connection (210) being connected to the relatively slower memory. After the information is received by the first or other access channel circuit (300) it is stored in a relatively faster physical memory module (203) via an appropriate memory bus (209). The information may be stored directly by the first or the other access channel if they are connected directly via a memory bus (210) to relatively faster memory. Otherwise the internal buses (306) and (307) and the control and configure circuit (201) is used to transfer the information to an access channel that is connected to the relatively faster memory.

After the information/data has been moved to the relatively faster memory an interrupt may be issued via the interrupt connection (305) to the master device, which may then initiate the transfer of information/data from the relatively faster memory. The movement from a relatively slower to a relatively faster memory speeds up the actual transfer to the master device and hides access latency of slower memories.

Further, additional access channels (one or more) may be linked/chained when performing the automatic data transfer/ pre-fetch. In this way, each access channel is responsible for retrieving and storing a part of the complete content whereby a relatively large memory transaction mapped onto a specific access channel may be split up into multiple but smaller transactions thereby reducing the time the access channels are occupied.

Additional access channel(s) being used as part of the automatic data transfer are not required to be connected to a master device. However, this may not be a good solution for a system with multiple masters, since the extra access channels could not be used for anything other than automatic data transfers. In a single master system this could be a good solution depending on the final memory architecture.

Automatic data transfer may also be used to perform other tasks than transferring data/information from a relatively slower to a relatively faster physical memory. As one example, data/information residing in different memory modules may be moved/copied to a single memory module allowing for a consecutive data transfer to a master device.

A write operation could take place e.g. as follows:

The master device #0 (202) issues a write instruction, data/information to be written/stored and e.g. the memory/ address range or start address where the data/information is to be written on the incoming system bus #0 (304). This is received in the connected access channel circuit #0 (300) that determines the appropriate physical memory module (203) (e.g. #N) and corresponding memory bus (209) (e.g. #1). The information/data to be written is then sent via the selected memory bus (209) and written/stored in the physical memory module (203). An acknowledgement may be sent back to the access channel circuit (300), which may signal to the master device #0 e.g. via the interrupt connection (305), by polling, etc. This write process may be performed in parallel with other memory access(es) as long as they do not access the same specific physical memory module at the same time. If the access channel circuit connected to the master device is not connected directly to the memory module where the data is to be stored, the internal buses (306) and (307) and the control and configure circuit (201) may be used to transfer the request and information/data to an access channel that is connected to the applicable memory module (203).

An implementation with a single access channel circuit may provide e.g. a single connected memory accessing device/master device with memory access and be used as an automatic data transfer unit when the master device is not accessing the memory.

FIG. 3 illustrates a schematic representation of an embodiment of a single access channel circuit in a memory controller according to an embodiment of the present invention. Shown is an embodiment of an access channel circuit (300) comprising a 'source and destination selector' (303), a 'memory access controller' (301) and a 'memory module selector' (302). A specific access channel circuit (300) represents a specific logical access channel. In this particular example, the access channel circuit (300) is number k and is connected to a single master device #k (see e.g. FIG. 2 (202)) via a system bus #k (304, 308). The system bus #k (304, 308) comprises an (to the access channel circuit (300)) incoming system bus (304) and an outgoing system bus (308). Alternatively, several (>1) master devices may be connected to the access channel circuit (300) via the system bus #k (304, 308) depending on the specific implementation and/or need.

The source and destination selector (303) receives data/ information from the connected master device via the incoming system bus #k (304) and/or from the memory access controller (301) via connection (311). Control signal(s) from the memory access controller (301) via connection (312) to the source and destination selector (303) determines the data/information path in the source and destination selector (303), i.e. which information provided from either the system bus #k (304) or the memory access controller (301) is to be forwarded to the memory bus(es) (209). The source & destination selector (303) transmits the received data/information or part thereof to M+1 (in the notation used where the first memory bus is designated 0) connected physical memory modules (see e.g. FIG. 2 (203)) via M+1 memory buses (209). The value M may be equal to 0 or larger dependent on the specific embodiment/implementation, i.e. dependent on how many memory buses (209) are connected to the specific access channel circuit. A single memory bus (209) is preferably used for each physical memory module the access channel circuit (300) needs to have access to in this particular embodiment. The source and destination selector (209) also determines which specific memory bus (209) or memory buses (209) that is/are addressed for a given segment of data.

The memory access controller (301) also receives data/ information from the connected master device via the incoming system bus #k (304). Additionally, it may receive control/setup data/information from a 'Control and Configure' circuit (see e.g. FIG. 2 (201)) via control & setup #k connection (307) if appropriate. The memory access controller (301) is also connected to the outgoing system bus #k connection (308) for receiving of data/information from the memory module selector (302). In this way, it is e.g. possible for the memory access controller (301) to route/transmit data/information on the outgoing system bus #k (308) to the source and destination selector (303) via bus/connection (311) to be written at a new memory address, range, part, etc. This may e.g. be used to move data/information from a slow memory part to a fast memory part e.g. as part of a pre-fetch operation causing the wanted data/information to be present in a fast physical memory module when the master module needs to retrieve rather then in a relatively slower physical memory module thereby speeding the data transfer up and reducing the time of occupancy of the access channel circuit (300). The pre-fetch operation may e.g. be initiated on the basis of performing pattern matching on the information/ data received via the incoming system bus #k (304) from the connected master device and/or on the basis of control and configure commands, instructions, etc. received via the control and setup #k connection (307). The memory access controller (301) is also connected to the master device, connected to the system bus #k, via an interrupt connection (305) used for issuing an interrupt to the connected master device e.g. signalling that a given task, process, etc. (e.g. a pre-fetch operation) is done. If several master devices is connected to the system bus #k then preferably only one interrupt connection is available for them all which may be connected to one or more of them, i.e. the interrupt connection does not have to be connected to each master device connected to the same system bus. Further, the memory access controller (301) is connected to the source and destination selector (303) via connections (311) and (312) used for transmitting data/information and control signals, respectively. The control signals (312) specifies which data/ information, selected from either the system bus #k (304) or the memory access controller (301), is to be forwarded to the memory bus(es) (209), i.e. if data/information is to be received from the memory access controller (301) it signals this via connection (312). The memory access controller (301) may also receive and transmit register, command, configuration, etc. data/information from and to the 'Control and Configure' circuit (shown in FIG. 2 (201)) via control & setup #k connection (307) and (306), respectively. The special purpose registers associated with the access channel circuit (300) may in this way be written to/updated or read from by the 'Control and Configure' circuit (shown in FIG. 2 (201)).

The memory module selector (302) receives data/information from N+1 (in the notation used where the first memory module is designated 0) physical memory modules via memory module input connections (210). The value N may be equal to 0 or larger dependent on the specific embodiment/implementation, i.e. dependent on how many physical memory modules that are connected to the specific access channel circuit (300). The memory module selector (302) also provides data/information via the outgoing system bus #k (308) to the connected master device(s) and/or to the memory access controller (301) via the system bus (308) when applicable.

The memory module selector (302) is responsible for selecting which specific physical memory module input (210) is to be connected to the outgoing system bus #k (308) during a read access of a specific memory module so that a memory access requesting master device is connected to the appropriate memory module. A memory interface of a memory module, being accessed by an access channel circuit/channel (300), preferably tags, associates or the like that specific access channel/circuit (300) with a unique identifier like an identification code, address, etc. Each unique identifier identifies a specific access channel circuit (300). Alternatively, other schemes may be used. The identification code/address is then sent back from the memory interface of the physical memory module (203) to all access channels connected to the same memory module (203) via the memory module bus (210). Dependent on the id-code/address the memory module selector (303) of the correct access channel/circuit (300) connects the appropriate memory module bus (209) to the incoming system bus (304) in the correct access channel/circuit (300).

The source and destination selector (303) is responsible for enabling an access to any memory bus (209) from either the system bus (304) connected to the specific access channel circuit (300) or the bus/connection (311) connected to the memory access controller (301). The data path through the source and destination selector (303) is determined by control signals from the memory access controller (301).

The memory access controller (301) monitors the system buses (304, 308, 307). Dependent on the information/data, e.g. in the form of an given memory address, on one of these buses (304, 308, 307) the corresponding memory bus (209) is selected as output by control signals (312) from the memory access controller (301) to the source and destination selector (303). Preferably, the mapping of bus addresses to specific memory buses (209) is programmable through a pair of registers (not shown) for each memory bus (209). The registers specify lower and upper address for a specific address range that is to be mapped on a given memory bus (209). This enables high flexibility of the memory controller (200) as the possible memory access of a given access channel circuit (300) may be changed dynamically during operation.

The memory access controller (301) can initiate automatic data transfer/an automatic pre-fetch operation between physical memories based on different "triggers", codes, commands, etc. The triggers can be either through a direct command received from the Control and Configure circuit (see 201 in FIG. 2) via connection (307) or by detection of a predefined address on the incoming system bus (304) (input buses to source and destination selector circuit (303) and to memory access controller (301)). The memory access controller (301) preferably comprises multiple registers through which it is possible to configure multiple address regions of one or more addresses, as explained earlier. If a current address on e.g. the system bus (304) maps into one of these address regions, the memory access controller (301) can initiate an automatic memory access sequence a configurable number of cycles later. The number of cycles can e.g. be configured in a special purpose register. Master device(s) issuing an automatic data transfer can be notified on completion in two ways, namely polling or interrupt, as explained earlier. The Control and Configure circuit (see 201 in FIG. 2) is preferably notified through a special purpose register from each access channel when an automatic transfer is completed and then a master device (202 in FIG. 2) can read the register and extract the information. The memory access controller can preferably also be setup to generate an interrupt on completion of an automatic data transfer where the interrupt signal can be connected directly to a specific master device (202 in FIG. 2) as e.g. shown by connections 305 in FIGS. 2 and 3.

Additionally, it is also possible to enable access channels/circuits (300) to operate in chains (of 2 or more channels (300)) for e.g. a retrieval of a large amount of data/information from the memory so that each channel (300) is responsible for retrieving a part of the information in parallel via their own system bus. This requires that the specific channels (300) are connected to the same master device requesting the large amount of information via the same system bus. This 'spreads' out the load of each access channel and reduces the time used by the information retrieval. This is also the case for smaller amounts of information.

If an access channel circuit (300) is used only for automatic data transfer it does not have to be (but may be) connected to a system bus (304, 308) as the internal bus (306) may be used to provide the retrieved information/data to another access channel circuit (300) and/or the control and configure circuit. The other access channel circuit (300) could then receive the information via internal bus (307).

In the following a few examples of a flow of information/data in the access channel circuit (300) is given to better illustrate how it works in this particular embodiment.

The memory range is mapped during setup and configuration (through software) of the individual access channels and the control and configure block. The mapping is dependent of how each access channel is connected to the physical memory modules, which may vary for different implementations. The most flexible implementation is to connect all access channels to all physical memory modules.

A read process could take place e.g. as follows:

An instruction, command, specific pattern, etc. for retrieval of/reading the content of a given memory range/address and e.g. a memory range or start address and offset are received on the incoming system bus #k (304) thereby being received by the memory access controller (301) and the source and destination selector (303). The memory access controller (301) interprets the instruction and/or memory range and determines the type of memory access and whether the access channel circuit (300) is able to handle the request by itself, i.e. if the access channel circuit (300) is connected to the specific physical memory module (203) comprising the information. If the access channel circuit (300) is able to handle the request, a control signal (312) is issued to the source and destination selector (303) determining that the information provided from the system bus #k (304) (and not the memory access controller (301)) is to be forwarded to the memory bus (209). The source and destination selector (303) then determines the physical memory module (203) that corresponds to/comprises the requested memory range/address and the memory bus (209) associated with the specific memory module(s) (203) and sends an instruction via the selected memory bus (209) (e.g. memory bus #2) to the appropriate memory module (203) (e.g. memory module #2), which returns the data/information stored at the requested memory range to access channel circuit #k (300) via a memory module connection (210) (e.g. connection #N) to the memory module selector (302). The memory module selector (302) selects which memory module input is to be connected to the outgoing system bus #k (308). Preferably, the memory interface of a memory module being accessed by the access channel circuit (300) tags that specific access channel circuit (300) with a unique identifier (e.g. code, address, etc.), which is sent back to all access channel circuits (300) being connected to the same memory module bus (210). Based on this unique identifier, the memory module selector (302) connects the correct memory module bus (210) in the correct access channel circuit (300) to its outgoing system bus #k (308) so that the information to be retrieved/read is available for the connected master device.

If the access channel circuit #k (300) is not connected to the memory module (203) comprising the request information/data, the internal buses (306) and (307) and the control and configure circuit (201) are used to transfer the request to an access channel circuit (300) that is connected to the applicable memory module (203). The information/data is transmitted back to access channel circuit (300) #k in the same way. However, each access channel circuit (300) is preferably connected to each physical memory module (203). This read process may be done in parallel with other master devices accessing the memory as long as they do not access the same specific physical memory module at the same time.

A write process could take place e.g. as follows:

A write instruction, command, specific pattern, etc. and information/data to be written to a given memory range/address are received on the incoming system bus #k (304) by the memory access controller (301) and the source and destination selector (303). The memory access controller (301) interprets the instruction and/or memory range and determines the type of memory access and whether the access channel circuit (300) is able to handle the request by itself, i.e. if the access channel circuit (300) is connected to the specific physical memory module (203) being written to. If the access channel circuit (300) is able to handle the request, a control signal (312) is issued to the source and destination selector (303) determining that the information provided from the system bus #k (304) (and not the memory access controller (301)) is to be forwarded to a memory bus (209). The source and destination selector (303) then determines the physical memory module (203) that corresponds to/comprises the requested memory range/address and the memory bus (209) associated with the specific memory module(s) (203) and sends a write instruction and the content to be written via the selected memory bus (209) (e.g. memory bus #2) to the appropriate memory module (203) (e.g. memory module #2).

After the information is stored in the memory module (203), an acknowledgement may be sent back to the access channel circuit (300), which may signal to the master device #0 e.g. via the interrupt connection (305), by polling, etc. This write process may be performed in parallel with other memory access(es) as long as they do not access the same specific physical memory module at the same time. If the access channel circuit connected to the master device is not connected directly to the memory module where the data is to be stored, the internal buses (306) and (307) and the control and configure circuit (201) may be used to transfer the request and information/data to an access channel that is connected to the applicable memory module (203).

A pre-fetch/Automatic data transfer process could take place e.g. as follows:

An pre-fetch/automatic data transfer instruction, command, specific pattern, etc. for retrieval of/reading the content to be moved from a given source memory range/address to a given target memory range/address are received on the incoming system bus #k (304) thereby being received by the memory access controller (301) and the source and destination selector (303). The memory access controller (301) interprets the instruction and/or memory range and determines the type of memory access and whether the access channel circuit (300) is able to handle the request by itself, i.e. if the access channel circuit (300) is connected to the specific physical source memory module (203) comprising the information to be copied/moved. If the access channel circuit (300) is able to handle the request, the information/data is retrieved in the way described above in connection with the read process.

When the data/information to be copied/moved is provided at the outgoing system bus #k (308) via the memory module connection (210), the memory access controller (301) retrieves this data/information directly via its connection to the outgoing system bus #k (308) and provides it to the source and destination selector (303) via connection (311) together with a control signal (312) specifying that the information/data on connection (311) is to be written at the specified target address/memory range. The writing of the information/data is performed as described above in connection with the write process.

When the information/data has been moved/copied to the target memory an interrupt may be issued by the memory access controller (301) via the interrupt connection (305) to the master device, which may then initiate the transfer of information/data from the relatively faster memory.

If the access channel circuit #k (300) is not connected to the source/and or target memory module (203), the internal buses (306) and (307) and the control & configure circuit (201) is used to transfer the request to an access channel circuit (300) that is connected to the applicable memory module (203). The information/data is transmitted back to access channel circuit (300) #k in the same way. However, each access channel circuit (300) is preferably connected to each physical memory module (203).

Further, additional access channels (one or more) may be linked/chained when performing the automatic data transfer/pre-fetch. In this way, each access channel is responsible for retrieving and storing a part of the complete content whereby a relatively large memory transaction mapped onto a specific access channel may be split up into multiple but smaller transactions thereby reducing the time the access channels is occupied.

Note, that other access channels(s) being used as part of the automatic data transfer requires that the access channel(s) is not connected (as otherwise shown in the figure) to a master device or is idle during the automatic data transfer.

Figure 4A:
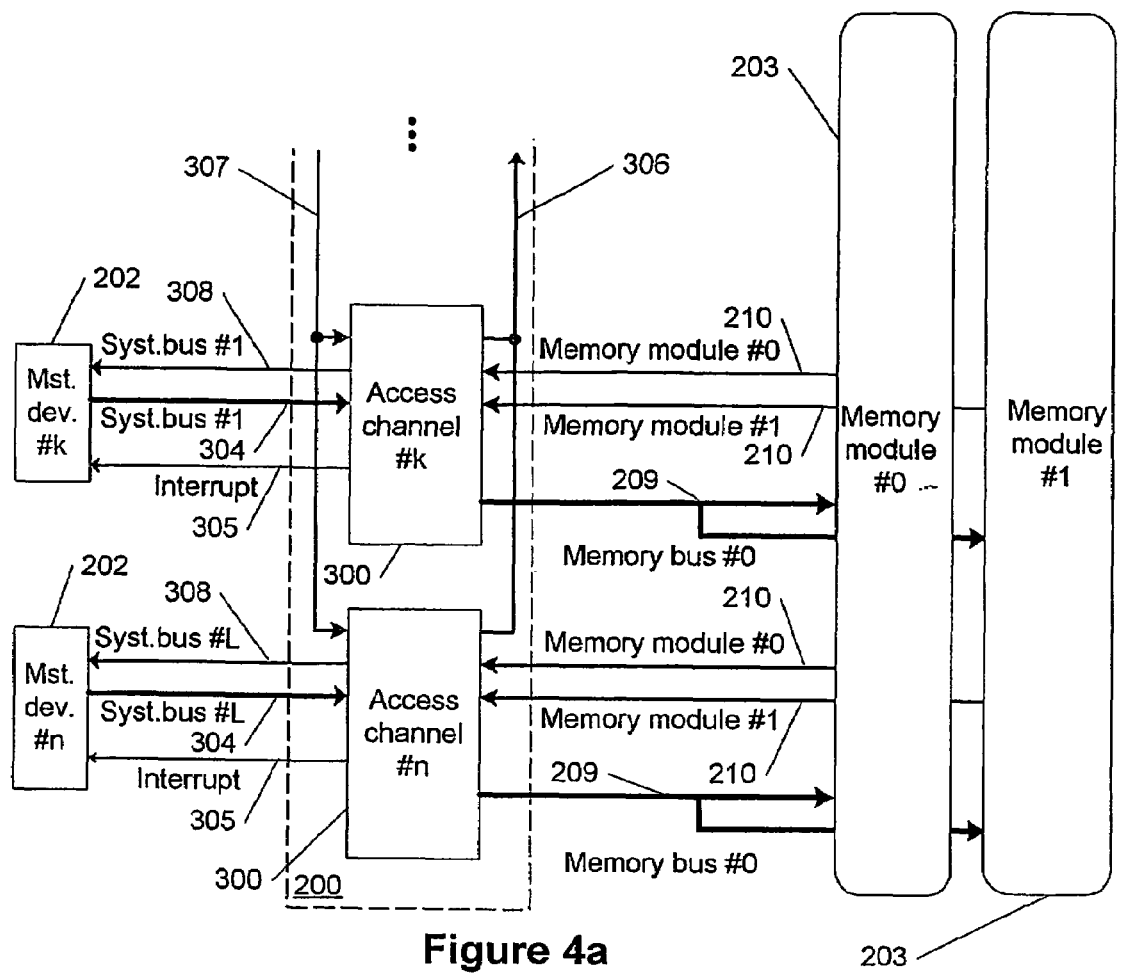
FIGS. 4a-4c illustrates different embodiments of configurations of access channel circuits.
Figure 4C:
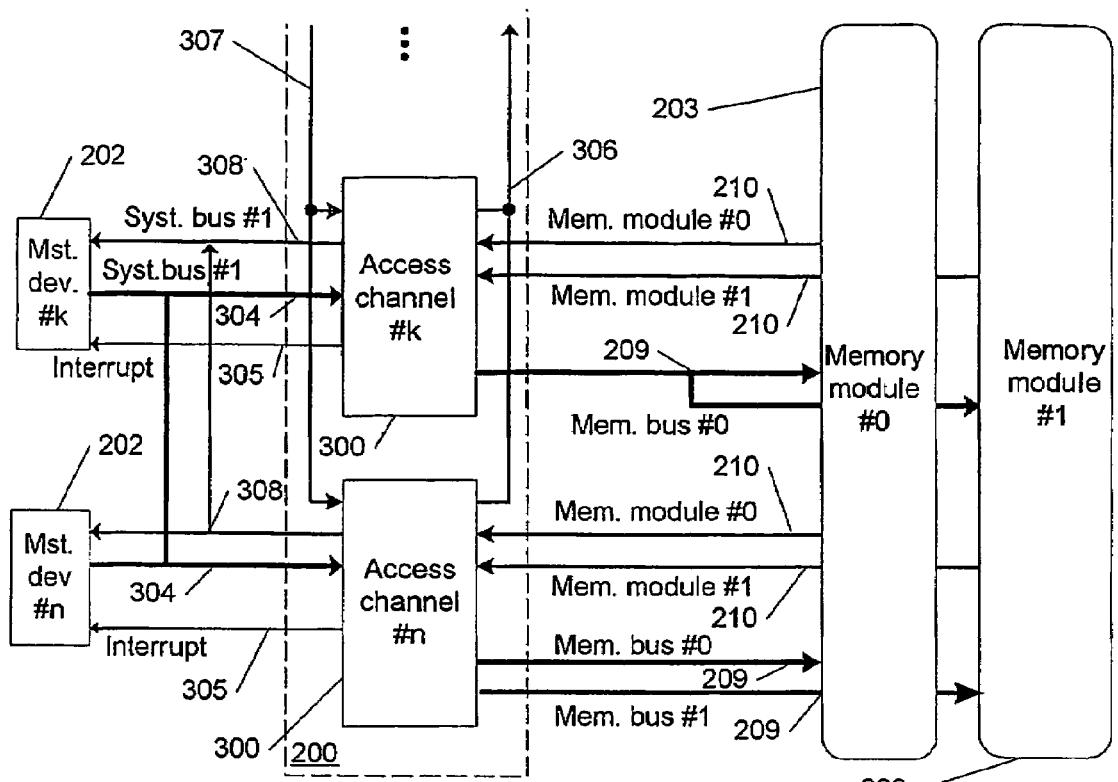
Figure 4B:
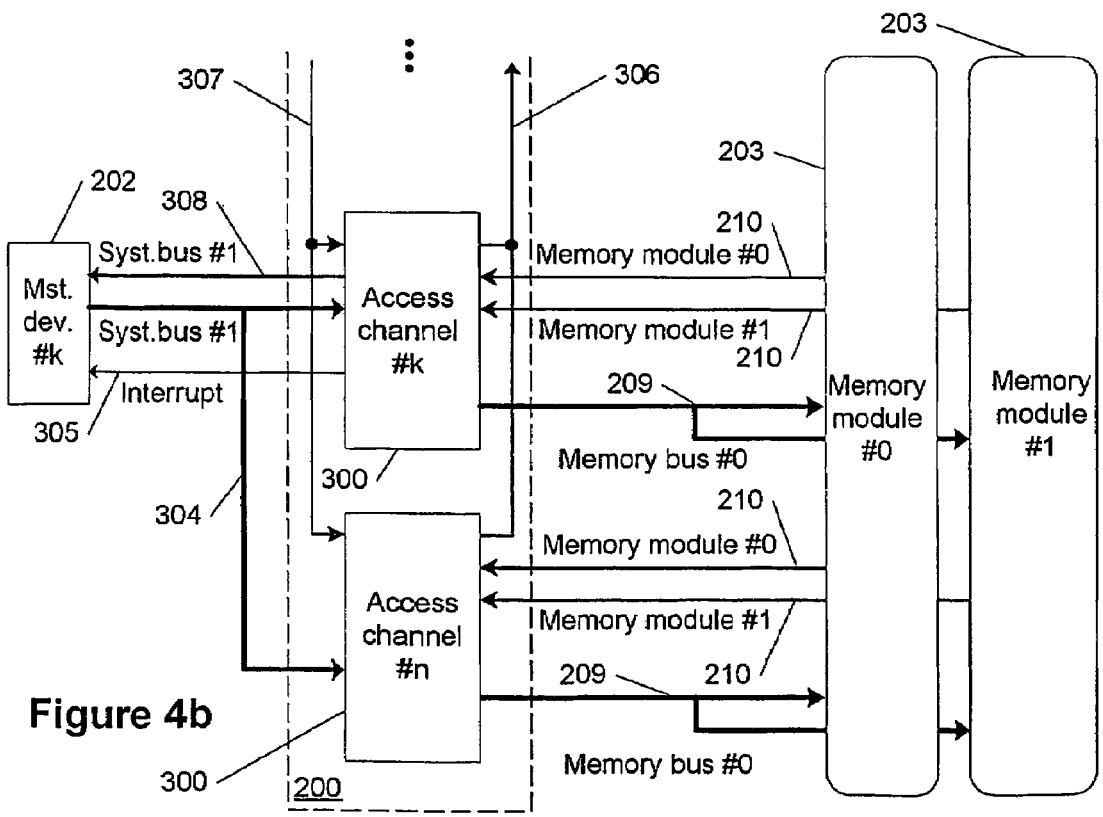

FIGS. 4a-4c illustrates different embodiments of configurations of access channel circuits. In these examples, only 2 memory modules (203) and two access channel circuits (300) are shown. The two access channel circuits (300) are connected to the two memory modules (203) via two memory module connections #0 and #1 (210).

FIG. 4a corresponds to the configuration shown in FIG. 2 with the exception that each memory module (203) is connected to the same memory bus (209) (memory bus #0). This reduces the complexity of the design. However, the risk of conflict between the master devices #k and #n (202) during memory access is increased unless the master devices (202) do not very often need access at the same time or never. A further reduction in complexity without increasing the risk of conflict significantly, could e.g. be to not have the second access channel circuit #n (300) if the master devices (202) never or seldom accesses the memory at the same time (i.e. uses the only memory bus #0). However, the second access channel circuit #n (300) could be used for automatic data transfers, etc.

In FIG. 4b is shown a configuration where one of the access channel circuits (300) only functions as an automatic data transfer engine (access channel #n). This examples shows transfer engines chained together, i.e. the access channel circuits #k and #n (300) are connected to the same system bus #1 (304; 308). Since access channel circuit #n (300) is also connected to the system bus #1 (304; 308) data transfer is enabled directly to the master device #k (202). Otherwise it could only be used for internal memory copy (e.g. slow to fast).

In FIG. 4c is shown a configuration where two master devices (202) are connected via the same system bus (308) (system bus #1) and one access channel circuit #k (300) is connected via a single memory bus #0 (209) while the other access channel circuit #n (300) is connected by two memory buses #0 and #1 (209) each to a specific memory module #0 or #1 (203), respectively. In this way, one memory bus (#0) (209) is shared between the access channel circuits (300). Additionally, the connected master devices #k and #n (202) share/are connected to the same system bus #1 (304; 308).

Figure 5:
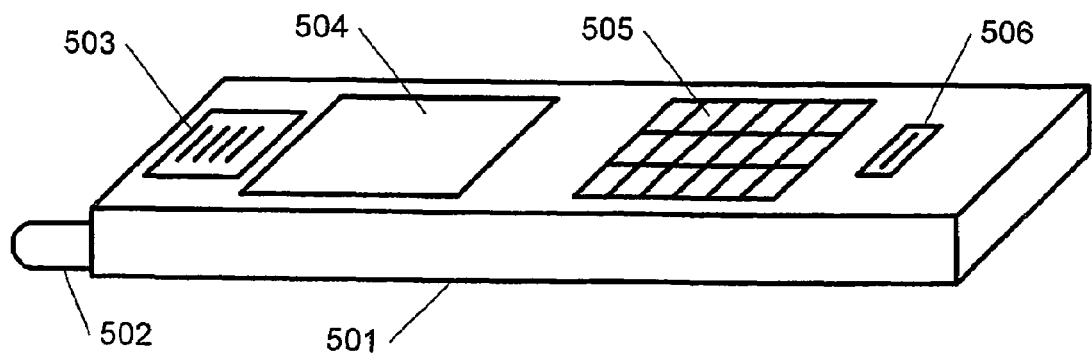
FIG. 5 illustrates a preferred embodiment of the invention, which may contain the memory controller and/or use the method according to the present invention.

FIG. 5 illustrates a preferred embodiment of the invention, which may contain the memory controller and/or use the method according to the present invention. Shown is a representation of a mobile communication terminal (501) like a mobile telephone, a smart-phone, PDA, etc. comprising a display (504), input means like a keypad, touch pad, touch-sensitive screen, etc. (505), a wireless communication transceiver (502), a sound capturing unit (506) like a microphone or the like, and a sound producing unit (503) like a speaker or the like. By including the memory controller and/or use the method, efficient and highly flexible memory access is provided. Additionally, the provided scalability of the invention enables the specific embodiment of the memory controller/method of memory access to be scaled to the appropriate need (speed, flexibility, etc.). Further, a reduction or elimination of the risk of conflict between memory accessing devices is enabled. However, in general, the invention is useable in connection with ASIC's, FPGAs, PLDs and other digital circuits, where memory access are used, and enhances/optimises the memory access of these.

The invention claimed is:

1. An electrical device for efficient and flexible control of memory access, the device comprising:

at least two access channel circuits, wherein at least one of the access channel circuits is connected to at least one memory accessing unit via at least one system bus and to at least one physical memory module, of a memory, wherein the at least one physical memory module comprises a first physical memory module and a second physical memory module;

the at least one access channel circuit providing memory access for the at least one memory accessing unit to at least a part of the memory, wherein at least one of the access channel circuits further comprises an automatic data transfer engine for transferring data/information from the first physical memory module of the memory to the second physical memory module of the memory prior to the at least one memory accessing unit retrieving the data/information.

2. An electrical device according to claim 1, wherein each of the at least two access channel circuits comprises an automatic data transfer engine, the automatic data transfer engines being connected to form a chain of automatic data transfer engines where each data transfer engine is responsible for transferring a different part of the data/information.

3. An electrical device for efficient and flexible control of memory access, the device comprising:

at least two access channel circuits, wherein at least one of the access channel circuits is connected to at least one memory accessing unit via at least one system bus and to at least one physical memory module, of a memory;

the at least one access channel circuit providing memory access for the at least one memory accessing unit to at least a part of the memory;

a control and configure circuit configured to dynamically control the at least two access channel circuits, the control and configure circuit allowing for an addition of additional access channel circuits;

wherein at least one of the access channel circuits comprises at least one special purpose register and is connected to the control and configure circuit, wherein the control and configure circuit is adapted to modify a content of the at least one special purpose register thereby allowing for reconfiguration of at least one of the access channel circuits without affecting another one of the access channels during an operation of the device.

4. An electrical device according to claim 3, wherein the at least one special purpose register is adapted to reconfigure at least one of the access channel circuits by configuring a mode of functionality and/or at least one access region of the memory.

5. An electrical device for efficient and flexible control of memory access, the device comprising:

at least two access channel circuits, wherein at least one of the access channel circuits is connected to at least one memory accessing unit via at least one system bus and to at least one physical memory module, of a memory, the at least one access channel circuit providing memory access for the at least one memory accessing unit to at least a part of the memory;

wherein the at least one memory module comprises a plurality of memory modules and the at least one access channel circuit comprises:

a memory access controller adapted to monitor an incoming system bus, connected to one of the memory accessing units, and an outgoing system bus connected to the memory accessing unit for a first identifier representing a given memory bus to be connected, the memory access controller providing a first control signal/code, based on the first identifier, representing the given memory bus and to where the given memory bus is to be connected, a source and destination selector for enabling access to a memory bus, connected to one of the memory modules of the memory, from the incoming system bus or the memory access controller dependent on the first control signal/code received from the memory access controller, and a memory module selector for selecting which of the memory modules is to be connected to the outgoing system bus, connected to the memory accessing device, during a given read access of one of the memory modules dependent on a second unique identifier.

6. A method of control of memory access between at least one memory accessing unit and a memory comprising at least one physical memory module, the method comprising the steps of:

providing, with at least one of at least two access channel circuits, memory access for the at least one memory accessing unit to at least a part of the memory, wherein the at least one access channel circuit is connected to the least one memory accessing unit via at least one system bus and to the at least one physical memory module and wherein the at least one memory module comprises a first memory module and a second memory module; and providing automatic data transfer of data/information with the access channel circuit, the access channel circuit comprising an automatic data transfer engine for transferring data/information from the first physical memory module of the memory to the second physical memory module of the memory prior to the memory accessing unit retrieving the data/information.

7. A method according to claim 6, wherein the automatic data transfer engine comprises a plurality of data transfer engines, and the access channel circuit comprises a plurality of access channel circuits, wherein the plurality of automatic data transfer engines of the plurality of access channel circuits are connected to form a chain of automatic data transfer engines and wherein each data transfer engine is responsible for transferring a portion of the data/information.

8. A method of control of memory access between at least one memory accessing unit and a memory comprising at least one physical memory module, the method comprising the steps of:

providing, with at least one of at least two access channel circuits, memory access for the at least one memory accessing unit to at least a part of the memory, wherein the at least one access channel circuit is connected to the least one memory accessing unit via at least one system bus and to the at least one physical memory module;

dynamically controlling the at least two access channel circuits with a control and configure circuit, the control and configure circuit allowing for an addition of additional access channel circuits; and modifying, with the control and configure circuit, a content of at least one special-purpose register, wherein at least one access channel circuit of the at least two access channel circuits is connected to the control and configure circuit, thereby allowing for reconfiguration of the at least one access channel circuit without affecting another one of the at least two access channel circuits during an operation of the access channel circuits.

9. A method according to claim 8, further comprising configuring a mode of functionality and/or at least one access region of the memory.

10. A method of control of memory access between at least one memory accessing unit and a memory comprising at least one physical memory module, the method comprising the steps of:

providing, with at least one of at least two access channel circuits, memory access for the at least one memory accessing unit to at least a part of the memory, wherein the at least one access channel circuit is connected to the least one memory accessing unit via at least one system bus and to the at least one physical memory module, wherein the at least one memory accessing unit comprises at least two memory accessing units and the at least one memory module comprises a plurality of memory modules; and providing memory access by one of the at least two access channel circuits for each connected one of the at least two memory accessing units where each of the at least two access channel circuits is connected with each of the plurality of memory modules of the memory; wherein the at least one memory accessing unit comprises a plurality of memory accessing units;

monitoring, with a memory access controller for a first identifier representing a given memory bus to be connected, the memory access controller comprising the access channel circuit, an incoming system bus, connected to one of the memory accessing units, and an outgoing system bus connected to another one of the memory accessing units;

providing, with the memory access controller, a first control signal/code, based on the first identifier representing the given memory bus and to where the given memory bus is to be connected;

enabling access, with a source and destination selector, to another memory bus, connected to one of the memory modules of the memory, from the incoming system bus or the memory access controller dependent on the first control signal/code received from the memory access controller; and selecting, with a memory module selector, which of the memory modules is to be connected to the outgoing system bus, connected to the memory accessing device, during a given read access of a specific one of the memory modules dependent on a second unique identifier.

* * * * *

UNITED STATES PATENT AND TRADEMARK OFFICE
CERTIFICATE OF CORRECTION

PATENT NO. : 7,231,484 B2  Page 1 of 1
APPLICATION NO. : 10/529621
DATED : June 12, 2007
INVENTOR(S) : Berenyi et al.

It is certified that error appears in the above-identified patent and that said Letters Patent is hereby corrected as shown below:

In Column 4, Line 26, delete "incoming-data/information" and insert -- incoming data/information --, therefor.

In Column 4, Line 30, delete "simulaneously" and insert -- simultaneously --, therefor.

In Column 5, Line 44, delete "first." and insert -- first --, therefor.

In Column 5, Line 61, delete "thereof" and insert -- thereof) --, therefor.

In Column 7, Line 23, delete "a-second" and insert -- a second --, therefor.

In Column 10, Line 29, delete "A)" and insert -- 0) --, therefor.

In Column 10, Line 30, delete "channel-circuits" and insert -- channel circuits --, therefor.

In Column 18, Line 19, delete "pre-fetch/Automatic" and insert -- pre-fetch/automatic --, therefor.

Signed and Sealed this

Thirteenth Day of May, 2008

JON W. DUDAS
*Director of the United States Patent and Trademark Office*